H. L. BOCK.
COMBINED RADIATOR AND HEADLIGHT FOR MOTOR VEHICLES.
APPLICATION FILED SEPT. 11, 1912.

1,138,182. Patented May 4, 1915.

Witnesses
W. K. Ford
James P. Barry

Inventor
Henry L. Bock.
By Whittemore Hulbert & Whittemore
Attys

UNITED STATES PATENT OFFICE.

HENRY L. BOCK, OF TOLEDO, OHIO, ASSIGNOR TO WILLIAM E. BOCK, OF TOLEDO, OHIO.

COMBINED RADIATOR AND HEADLIGHT FOR MOTOR-VEHICLES.

1,138,182.     Specification of Letters Patent.     Patented May 4, 1915.

Application filed September 11, 1912. Serial No. 719,730.

*To all whom it may concern:*

Be it known that I, HENRY L. BOCK, a citizen of the United States of America, residing at Toledo, in the county of Lucas and State of Ohio, have invented certain new and useful Improvements in Combined Radiators and Headlights for Motor-Vehicles, of which the following is a specification, reference being had therein to the accompanying drawings.

The invention relates to motor vehicles, and has for its object a more convenient arrangement of the headlight and one in which a single light will serve the purpose of two. In the present state of the art the radiator for cooling the engine is almost universally arranged centrally in front of the vehicle, while a pair of headlights are arranged upon opposite sides thereof, and this arrangement is one which prevents interference with the functions of the radiator or any obstruction to the current of air passing therethrough, but to properly illuminate the path on both sides of the road the two lights are necessary.

With my invention I simplify the construction by employing a single lamp which is mounted on the radiator frame, preferably above the active radiating surface. In this position the light is thrown equally on both sides of the road without any interference with the radiator in the performance of its functions.

Figure 1:
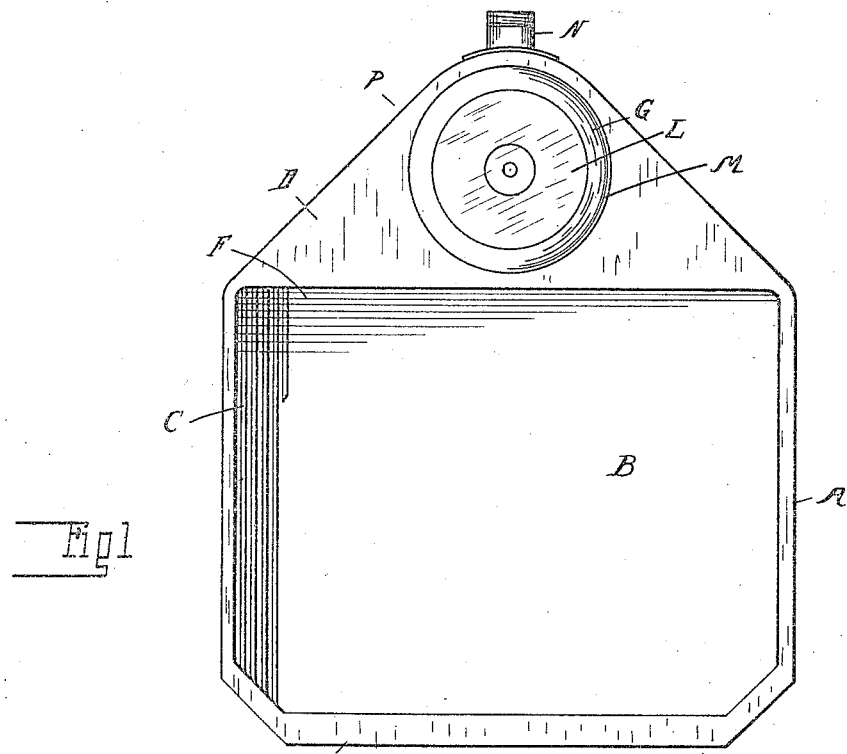
Figure 2:
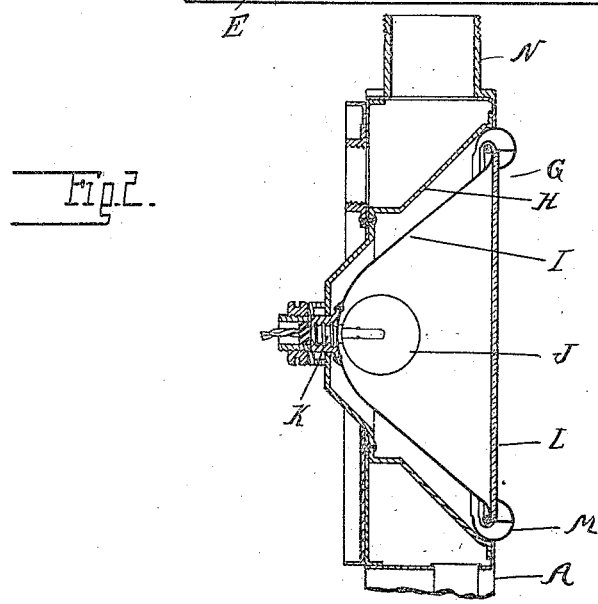

In the drawings: Figure 1 is a front elevation of my combined radiator and headlight. Fig. 2 is a vertical, central section therethrough.

A is the radiator frame, which is of the usual form, providing a substantially rectangular open panel B for the radiating surface. As illustrated, the radiator is of the type in which a series of vertically extending tubes C are connected at their upper and lower ends to headers D and E, and have sleeved thereon a series of transversely extending radiator wings or flanges F. My invention is not, however, limited to this type of radiator, as it is equally applicable to other types.

With the construction shown, the upper header D is of sufficient height to provide space centrally thereof for a headlight G. This headlight comprises a conical case H, which is secured in the header to form a water-tight joint therewith, its front edge being preferably flush with the front of the radiator, while the rear end may extend slightly through the radiator and in rear thereof. Within the case H is arranged the usual parabolic or other reflector I, with a suitable illuminant such as the electric bulb J, having a socket fitting K.

L is the transparent face surrounded by the beaded frame M.

It is common practice in radiator construction to form the upper header with an oval top which conforms to the shape of the hood inclosing the engine, while at the center of the top of this header a filler is arranged. With my improved construction I employ the same arrangement, a filler N being arranged at the center while the contour P of the header may conform to the shape of the hood. It is however necessary to form the header of sufficient height to receive the lamp.

In use, the arrangement of the headlight is such as to illuminate the path equally well on both sides and the appearance presented by the light arranged centrally of the radiator is a pleasing one. Furthermore the setting of the lamp case into the header is in effect providing said case with a water-jacket, which serves to limit the temperature from the lamp.

What I claim as my invention is:

The combination with a radiator frame, of a headlight, and a header for said radiator surrounding said headlight and forming a water-jacket therefor.

In testimony whereof I affix my signature in presence of two witnesses.

HENRY L. BOCK.

Witnesses:
R. F. SCHNEIDER,
O. W. BAGLEY.